United States Patent
Myers et al.

(10) Patent No.: US 11,491,805 B2
(45) Date of Patent: *Nov. 8, 2022

(54) PERSONALIZATION VENDING KIOSK

(71) Applicant: CreateMe Technologies LLC, New York, NY (US)

(72) Inventors: Thomas C. K. Myers, San Francisco, CA (US); Khamvong Thammasouk, San Jose, CA (US); Jinhwa Jung, San Jose, CA (US); Benjamin R. Waller, IV, Oakland, CA (US); Brett Jason Stern, Portland, OR (US)

(73) Assignee: CreateMe Technologies LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,058

(22) Filed: Jun. 22, 2022

(65) Prior Publication Data

US 2022/0314642 A1    Oct. 6, 2022

Related U.S. Application Data

(63) Continuation of application No. 17/501,609, filed on Oct. 14, 2021, which is a continuation of application (Continued)

(51) Int. Cl.
*B41J 3/407* (2006.01)
*B41J 11/00* (2006.01)
(Continued)

(52) U.S. Cl.
CPC .............. *B41J 3/4078* (2013.01); *D05C 5/04* (2013.01); *D05C 7/00* (2013.01); *D06P 5/002* (2013.01);
(Continued)

(58) Field of Classification Search
CPC ......... B41J 3/4078; B41J 11/002; D05C 5/04; D05C 7/00; D06P 5/002; G06Q 30/0621
See application file for complete search history.

(56) References Cited

U.S. PATENT DOCUMENTS 4,767,111 A * 8/1988 Guenther ............... D05C 13/00
269/319
5,433,158 A   7/1995 Moore, III
(Continued)

FOREIGN PATENT DOCUMENTS

CN    109624517    4/2019
CN    110675557    1/2020
(Continued)

OTHER PUBLICATIONS

U.S. Appl. No. 17/232,089, Non-Final Office Action, dated Jun. 14, 2021, 9 pages.
(Continued)

*Primary Examiner* — Yaovi M Ameh
(74) *Attorney, Agent, or Firm* — Kilpatrick Townsend & Stockton LLP

(57) ABSTRACT

Kiosk systems are used for personalizing articles. The articles may include an item to be personalized assembled with components of packaging in a pre-hooped configuration. The system may include a housing and a personalization system within the housing. The personalization system may include a plurality of system components for personalizing the article. The system may also include a conveying system within the housing. The conveying system may be used to transfer the article in the pre-hooped configuration
(Continued)

between the system components of the personalization systems. The system may also include a control system in the housing and/or remote from the housing. The control system may receive a personalization order and in response the control system may control the system components of the personalization systems and the conveying system so that the article is personalized without human intervention once within the housing.

20 Claims, 14 Drawing Sheets

Related U.S. Application Data

No. 17/232,089, filed on Apr. 15, 2021, now Pat. No. 11,161,353.

(60) Provisional application No. 63/111,591, filed on Nov. 9, 2020.

(51) Int. Cl.
    *D06P 5/00* (2006.01)
    *D05C 7/00* (2006.01)
    *G06Q 30/06* (2012.01)
    *D05C 5/04* (2006.01)

(52) U.S. Cl.
    CPC ......... *G06Q 30/0621* (2013.01); *B41J 11/002* (2013.01)

(56) References Cited

U.S. PATENT DOCUMENTS

| | | | |
|---|---|---|---|
| 10,189,278 B1* | 1/2019 | Friedrich | B41J 11/0024 |
| 11,161,353 B1* | 11/2021 | Thammasouk | D06P 5/002 |
| 2001/0055123 A1 | 12/2001 | Ryan et al. | |
| 2002/0013745 A1 | 1/2002 | Funahashi et al. | |
| 2009/0056567 A1 | 3/2009 | Ando et al. | |
| 2010/0129789 A1* | 5/2010 | Self | B01L 9/06 |
| | | | 700/214 |
| 2015/0059632 A1 | 3/2015 | Amakawa et al. | |

FOREIGN PATENT DOCUMENTS

| | | |
|---|---|---|
| CN | 111204121 | 5/2020 |
| CN | 112529113 | 3/2021 |
| WO | 2004044671 | 5/2004 |
| WO | 2020227311 | 11/2020 |

OTHER PUBLICATIONS

U.S. Appl. No. 17/232,089, Notice of Allowance, dated Aug. 27, 2021, 14 pages.
U.S. Appl. No. 17/501,609, Non-Final Office Action, dated Dec. 29, 2021, 19 pages.
U.S. Appl. No. 17/501,609, Notice of Allowance, dated Mar. 25, 2022, 11 pages.
International Patent Application No. PCT/US2021/058439, International Search Report and Written Opinion, dated Feb. 23, 2022, 15 pages.

* cited by examiner

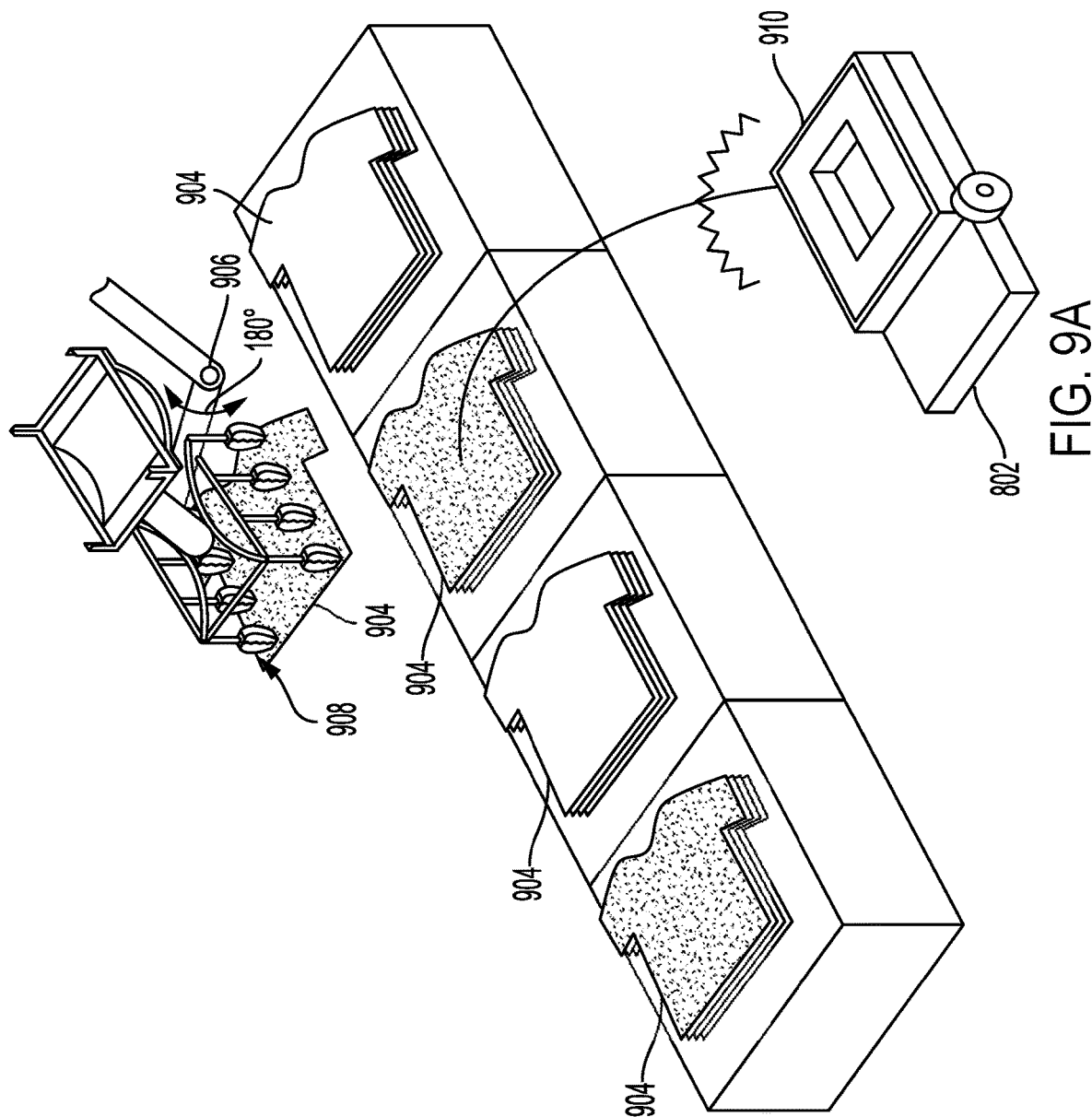

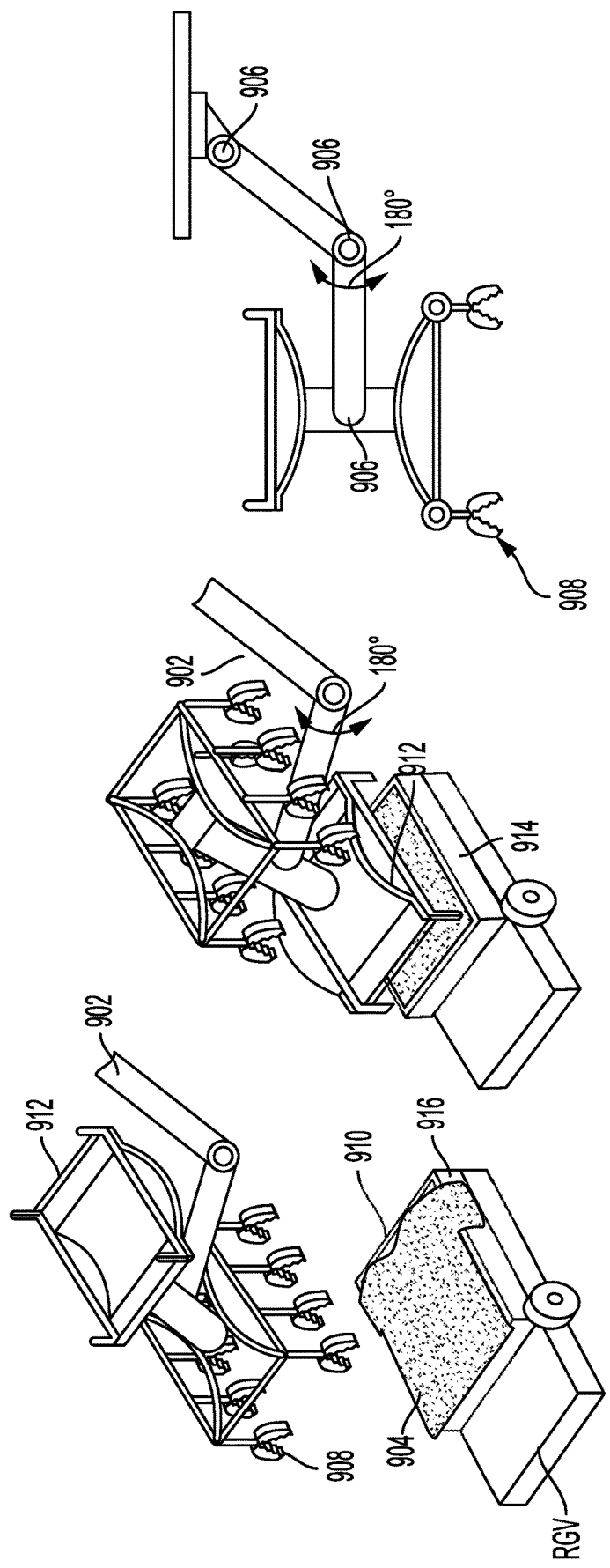

PERSONALIZATION VENDING KIOSK

CROSS-REFERENCE TO RELATED APPLICATIONS

This application is a continuation of U.S. application Ser. No. 17/501,609, filed Oct. 14, 2021, which is a continuation of U.S. application Ser. No. 17/232,089, filed Apr. 15, 2021, now U.S. Pat. No. 11,161,353, which claims the benefit of U.S. Provisional Application No. 63/111,591, filed Nov. 9, 2020, each of which is incorporated by reference herein in its entirety.

FIELD OF THE INVENTION

The present technology relates to the field of personalized articles, for example, clothing items, and more particularly to systems and methods for personalizing articles.

BACKGROUND

Personalization of garments and accessories is becoming more popular through embroidery and direct to garment (DTG) printing. Personalization of garments is currently a labor-intensive process that requires large areas for the machines to be placed so that skilled operators can work around the machines in order to handle the garments and operate the machines. There is a desire for personalization to be on-demand and in small volume so that, for example, a customer can order a personalized garment and in a matter of minutes after placing the order receive the personalized garment. Large scale operations are disadvantageous for on-demand personalization due to the high costs of the high-volume machinery, the space, and the skilled labor. Accordingly, there is a need for on-demand personalization equipment requiring little to no labor, having a small footprint, and capable of small volume orders.

BRIEF SUMMARY

The disclosed technology related to kiosk systems for personalizing articles. The articles may include an item to be personalized assembled with components of packaging in a pre-hooped configuration. The system may include a housing and a personalization system within the housing. The personalization system may include a plurality of system components for personalizing the article. The system may also include a conveying system within the housing. The conveying system may be used to transfer the article in the pre-hooped configuration between the system components of the personalization systems. The system may also include a control system in the housing and/or remote from the housing. The control system may receive a personalization order and in response the control system may control the system components of the personalization systems and the conveying system so that the article is personalized without human intervention once within the housing.

In some embodiments, the housing may include a window for receiving the article prior to personalization. In some embodiments, the housing may define a small footprint to in order to be placed inside a retail store or corridor of a retail center, for example the footprint may be less than 100 square feet, and may be less than 50 square feet.

In some embodiments, the personalization system includes at least one of an embroidery system or a direct to garment printing system (DTG system), and may include both. In some embodiments, the embroidery system includes an embroidery machine for embroidering the article in the pre-hooped configuration based on the personalization order.

In some embodiments, the conveying system includes a jig. The jig may include a plurality of wire elements and a bottom hooping plate coupled to the wire elements. The jig may be pivotable between a substantially vertical loading configuration and a substantially horizontal hooping configuration. The jig may receive the article around the jig in the loading configuration. The control system may cause the conveying system to transfer the jig to the hooping system and pivot the jig from the loading configuration to the hooping configuration to be hooped, and the hooping system may hoop the article by coupling a top hooping plate to the bottom hooping plate with the article clamped between.

The embroidery system may include an upper head and a lower cylinder head. The lower cylinder head may be positionable within the jig to embroider the article from a bottom side, and the lower cylinder head may pivot within the jig in order to embroider a portion of the article based on the personalization order. The jig may include a plurality of joints coupled between wire elements. The joints of the jig may be expandable joints and allow the wire elements to telescope within the joints in order to change a size of the jig. The control system may cause the conveying system to adjust the size of the jig prior to the jig receiving the article based on the personalization order.

In some embodiments the conveying system includes one or more of: a robotic arm, a conveyor belt, a tracked vehicle, a trackless vehicle, a jig, and a platen. The conveying system may include a plurality of self-powered trackless vehicles, wirelessly controlled by the control system. The control system may instruct the trackless vehicles to transfer the article between the plurality of system components.

In some embodiments, the conveying system includes a robotic arm. The robotic arm may include grippers. The control system may cause the robotic arm to transfer the article from a storage area with the grippers onto trackless vehicles. The robotic arm may further include an electromagnetic gripper. The electromagnetic gripper may hold a hooping plate, and the robotic arm may hoop the article with the hooping plate.

In some embodiments, the DTG system include a pretreatment system for applying pretreatment solution to the article and a direct to garment printer for printing a personalization onto the article based on the personalization order. The conveying system may transfer the article with the pretreatment solution applied from the pretreatment system to the direct to garment printer. In some embodiments, the DTG system includes a drying system for drying the article. The conveying system may transfer the article from the pretreatment system or the direct to garment printer to the drying system.

In some embodiments, the pretreatment system may apply the pretreatment solution to a sub-portion of the article based on a personalization size and location indicated in the personalization order. The pretreatment system may include a plurality of dispensing heads each able to separately dispense the pretreatment solution. The plurality of dispensing heads may be arranged along a first direction, and the control system may move the article relative to the plurality of dispensing heads in a second direction perpendicular to the first direction. The control system may cause dispensing of the pretreatment solution from any combination of one or more of the plurality of dispensing heads while causing the conveying system to move the article relative to the plurality of dispensing heads in order to apply the pretreatment solution to the sub-portion of the article based on the personalization order. The plurality of dispensing heads may dispense the pretreatment solution less than 10 mm from the article. The pretreatment system may include a scraper coupled to the plurality of dispensing heads and which may be actuated by the control system to contact the article and spread the applied pretreatment solution.

BRIEF DESCRIPTION OF THE SEVERAL VIEWS OF THE DRAWINGS

The disclosure will be readily understood by the following detailed description in conjunction with the accompanying drawings, wherein like reference numerals designate like structural elements, and in which:

FIGS. 9A-9D show internal system components of a kiosk including a robotic arm and gripper according to embodiments of the present technology.

DETAILED DESCRIPTION

Figure 1C:
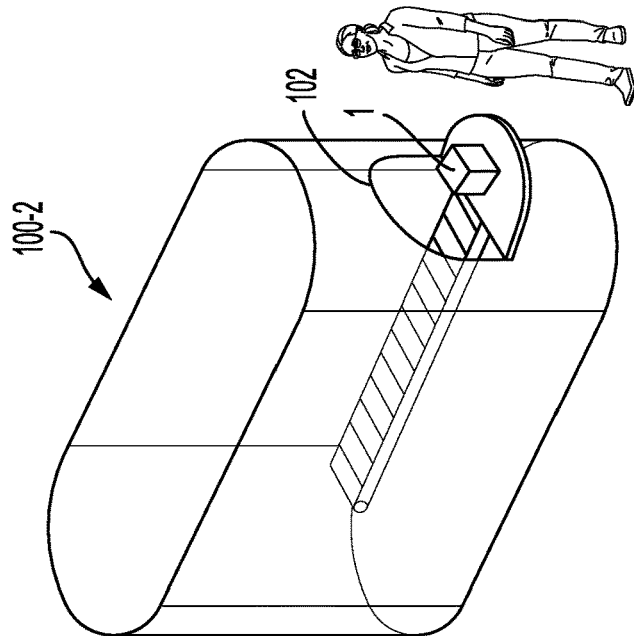
FIG. 1C shows a kiosk according to embodiments of the present technology.

The present technology includes systems and methods related to kiosks for storage, inventory management, retrieval, packaging, and/or personalization of articles, for example clothing articles. A kiosk may include one or more system components for one or more of: storage/inventory/product retrieval, packaging, and personalization, inside of a housing of the kiosk. The kiosk may include a control system coupled to actuators in to order be fully and/or partially automated so that in response to receiving a user input, the control system causes the actuators to perform one or more steps related to storage, inventory management, retrieval, packaging, and/or personalization of articles.

As used herein, the term "user" may refer to one or more humans being classified as one or more of: a skilled machine operator, an unskilled machine operator, a retail store clerk, and/or a retail customer. In embodiments, the steps disclosed herein relating to kiosks may be performed by any combination of one or more users and one or more automated systems coupled to a control system.

As used herein, the term "article", may refer to one or more items including, but not limited to, a piece of clothing (e.g. shirts, pants, socks, shoes, shorts, coats, jackets, skirts, dresses, underwear, hats, headbands, etc.), accessories (e.g. wallet, purse, etc.), and homewares (e.g. towels, pillow cases, blankets, mats, etc.). In embodiments, the term "article" may refer to the item in combination with a packaging, portion of a packaging, and/or a personalization support (e.g. a hooping assembly). In embodiments, the articles may be packaged as pre-hooped retail boxes that are ready to be personalized without any manual intervention. For example, in embodiments, an item may be: a shirt pre-hooped within a box, a shirt not pre-hooped within a box containing a bottom hooping portion, a shirt on a platen, a shirt in a closed box, a shirt in an open box, a shirt in a bag, etc. As shown in some of the figures, the article is shown as a T-shirt. However, a T-shirt is a non-limiting example of an article or a portion thereof, and any of the system components disclosed herein may be used with any type of article.

In embodiments, a kiosk may include: a housing, in which one more system components for storage, inventory management, retrieval, packaging, and/or personalization of articles are positioned within.

Housing

The housing of a kiosk may include internal support structures coupled to the system components, and an outer envelope. In embodiments, the outer envelope may be opaque in order to prevent outside viewers from observing some or all of the internal components, and/or to protect light sensitive processes from outside light. In embodiments, the outer envelope may be partially or completely made of a transparent material in order to allow outside observers to see the automated processes performed by one or more system components, for example personalization operations which may be a point of attraction for customers.

In embodiments, the outer envelope may define openings and/or doors to allow for the system components to receive articles from outside the kiosk, to deliver articles to the outside of the kiosk for pickup by a user from the inside of the kiosk, and/or to allow maintenance of the housing or system components. For example, in embodiments, a kiosk may define a single window corresponding to both an article receiving window and a pick up window. In embodiments, a kiosk may include one or more receiving windows and one or more separate pick-up windows.

In embodiments, the housing of a kiosk may have a footprint sized to fit into a small portion of a store, or in the middle of a walkway in a mall. For example, the footprint may be less than 50 sq. ft. Further for example, the height may be less than 10 feet.

System Components

A kiosk system may include one or more systems, each comprising one or more system components to perform processes related to: inventory management, retrieval, packaging, and/or personalization of articles. The number and size of system components may be based on the desired functions of a kiosk and the available footprint available for a kiosk. The system components may be arranged relative to each other vertically and/or horizontally. As will be discussed in greater detail below, a conveying system may transfer an article between system components with any relative orientation/position.

The system components may be components of one or more of personalization systems, conveying systems, and/or storage systems.

Personalization Systems

In embodiments, the personalization systems include one or more system components for receiving an un-personalized article and outputting a finished personalized article ready for the consumer. In embodiments, the personalization system may include, but is not limited to, embroidery systems, and/or direct to garment printing systems (DTG systems). In embodiments, personalization systems may include duplicate system components as discussed below in order to increase throughput.

Embroidery System

In embodiments, the system components of a kiosk may include one or more components forming an embroidery system. An embroidery system may include one or more hooping systems for hooping an article to be embroidered, and embroidery machines for embroidering an article to be embroidered. The control system of a kiosk may be connected to one or more, including all, of the components of an embroidery system in addition to a conveying system in order to automate processes of an embroidery system. For example, a control system may cause the conveying system to transfer an article from a receiving window of the kiosk to a hooping system, may cause the hooping system to apply a hoop to the article, may cause the conveying system to transfer the article from the hooping system to the embroidery machine, may cause the embroidery machine to embroider the article, and may cause the conveying system to transfer the article from the embroidery machine to a pick-up window, as will be discussed in greater detail below.

In some embodiments, a control system may select a backing for an embroidery process based on criteria of a personalization order, including for example the article material weight, the personalization art design, and the number of stitches per inch required for the design. In some embodiments, the number of combinations of article fabric, art design and backing material may be limited to a predetermined value, for example 3, 4, 5, 6, 7, 8, 9, or 10, in order to allow a reasonable inventory of components stored by the kiosk. The control system may cause the conveying system to transfer a backing from a storage area within the kiosk to a location within the kiosk, for example a hooping system, where in the backing is affixed, for example adhered to the article.

In some embodiments, the kiosk includes an inventory of pre-assembled hoop plate assemblies each including a bottom hoop plate attached to a hooping pad and a backing material. Each combination of hoop plate, hooping pad and backing material may correspond to one or more customer personalization options based on the article fabric weight, the personalization art design, and the number of stitches per inch required for the design. In some embodiments, in response to receiving a personalization order, the control system may determine the appropriate pre-assembled hoop plate assembly based on the article fabric weight, the personalization art design and the number of stitches per inch required for the design. With a pre-assembled hoop plate assembly determined, the control system may cause the conveying system to transfer and place the appropriate pre-assembled hoop plate assembly on an unloaded jig. With the appropriate pre-assembled hoop plate assembly coupled to the jig, the jig is ready to be dressed by the article, and then receive the top hooping plate and undergo the embroidery personalization operation.

In some embodiments, the kiosk includes a first inventory of pre-assembled hoop plate assemblies each including a bottom hoop plate attached to a hooping pad and a second assembly of different backing materials, including for example different sizes, shapes and thicknesses. The different backing materials may correspond to one or more customer personalization options based on the article fabric weight, the personalization art design, and the number of stitches per inch required for the design. In some embodiments, in response to receiving a personalization order, the control system may determine the appropriate backing based on the article fabric weight, the personalization art design and the number of stitches per inch required for the design. With a backing determined, the control system may cause the conveying system to transfer and place the appropriate backing to a pre-assembled hoop plate and padding assembly. In some embodiments, the backing material includes adhesive on its back face with a protective cover. Once an appropriate backing material is selected, the protective material may be peeled off by the conveying system and the backing material may be attached via its adhesive covered face to the bottom hooping plate and hooping pad.

In some embodiments, the kiosk control system communicates the status of its inventory of pre-assembled hoop plate assemblies when the inventor is low or out of a particular combination of pre-assemblies. In some embodiments, the kiosk has an inventory of retail boxes that package the articles in attractive presentation or packaging retail boxes, and that have a variety of pre-assembled hooping bottom plate, hooping pad and backing material, ready to receive articles for personalization, and hooping top plate, all pre-assembled and ready for the embroidery personalization operation. In embodiments including pre-assembled retail boxes, each pre-assembled retail box combination may be appropriate for one or more types of personalization orders received by a customer.

Direct to Garment Printing (DTG) Systems

In embodiments, the system components of a kiosk may include one or more components forming a DTG system. A DTG system may include one or more pretreatment systems for applying a pretreatment solution to an article to be personalized with DTG, a DTG printer for printing a personalization on an article to be personalized, and a drying system. In some embodiments, the DTG system may include drying systems integrated into other system components, e.g. a pretreatment system with an integrated drying system. The control system of a kiosk may be connected to one or more, including all, of the components of a DTG system in addition to a conveying system in order to automate processes of a DTG system. For example, a control system may cause the conveying system to transfer an article from a receiving window of the kiosk to a pretreatment system, may cause the pretreatment system to apply a pretreatment solution to the article, may cause the conveying system to transfer the article from the pretreatment system to the DTG printer, may cause the DTG printer to print a personalization on the article, may cause the conveying system to transfer the article from the DTG printer to a drying system, may cause the dryer system to dry the article with the DTG printed personalization and may cause the conveying system to transfer the article from the drying system to a pick-up window as will be discussed in greater detail below. In some embodiments, the control system may cause the conveying system to transfer an article to a drying system after a pretreatment process and/or a DTG printing process.

In embodiments, the DTG system may operate as a WET-ON-WET DTG printing process and therefore after applying the pretreatment solution, the DTG printing operation may be initiated without first drying the article. In embodiments, after the pre-treatment solution is applied by the pretreatment system, the article conveying system may transfer the article to the drying system before the DTG printing operation is performed. The system components of a DTG system may be arranged in any physical orientation relative to each other and the conveying system may transfer an article between the stages during a DTG process, including transferring an article to the same component twice at different stages of a process.

In embodiments, after the DTG printing stage, the next stage may be the drying stage. In embodiments, the drying system may perform drying of an article by applying a pressure and temperature using a heat plate. In embodiments, the drying of the ink and pretreatment solution may be accomplished by direct application of a radiant heat source, convection heat via forced air, and/or applying radiation from a light source, e.g. an LED light source.

In embodiments, one or more, including all, of the system components of a DTG system may be fully sealed and/or vented to the outside in order to prevent spreading undesirable chemicals and vapors within the kiosk enclosure and/or to the immediate vicinity outside of the kiosk.

Conveying Systems

As noted above, a kiosk may include a conveying system within the housing for transferring articles to/from/between the windows and system components. The conveying system may further be configured for manipulating system components, articles, and portions thereof within the kiosk. For example, the conveying system may unpack an item from a box, may package an item into a box, may place an item from a stack only a platen, or may hoop an item. Additional non-limiting examples of actions performed by the conveying system are discussed in greater detail below.

The conveying system may include a combination of one or more of: robotic arms, actuators, grippers, platens, jigs, conveyor belts (horizontal, vertical, curved and/or angled), railed vehicles, trackless vehicles, and similar conveying means.

The conveying system is connected to the control system and may be caused to transfer an article based on user input. For example, in response to receiving user input of a personalization order, the control system may determine instructions for the conveying system for transferring an article to/from system components, as will be discussed in greater detail below.

Control Systems

The system components of a kiosk, for example as discussed above, may be connected to a control system. The control system may comprise one or more processors. The one or more processors may be within the kiosk and/or may be remote. Remote processors may be included as part of remote computers, point of sale (POS) systems, servers (including cloud servers), and/or user devices (e.g. smartphones and tablets).

Figure 12:
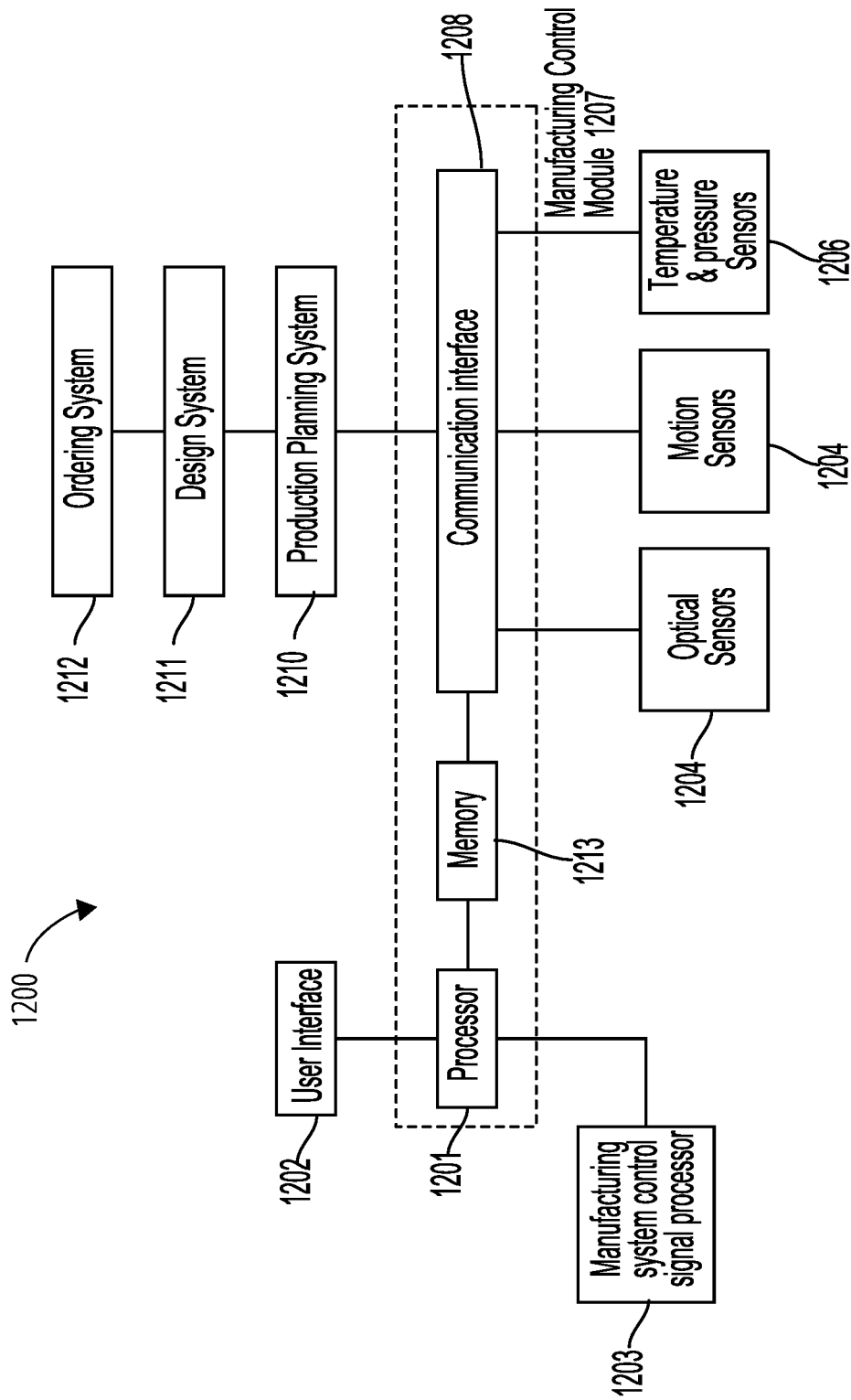
FIG. 12 shows a schematic of a control system of a kiosk according to embodiments of the present technology.

In embodiments, a control system 1200 includes various components including one or more of ordering systems 1212, design systems 1211, production planning systems 1210, user interface devices 1202, manufacturing systems and control signal processors 1203, for example as shown in FIG. 12. In embodiments, a control system may include a manufacturing control module 1207 including one or more processors 1201 coupled to memory modules 1213 and one or more communication interfaces 1208 to provide means for communicating with system components of the kiosk including optical sensors and/or cameras 1204, motion sensors 1205, temperature sensors 1206, smoke and aerosol pollutant sensors, and pressure sensors 1206. In embodiments, various other types of sensors may provide relevant environmental parameters such as the level of moisture present in the kiosk, viscosity of process fluids (e.g. pretreatment solution, DTG ink, etc.). Additionally, the control system may include one or more power sub-systems and power backup systems so that a kiosk may operate during power outages or inconsistencies.

The control system may be implemented at least partially in one or more computers, embedded systems, terminals, control stations, handheld devices, modules, any other suitable interface devices, or any combination thereof. In embodiments, the components of a control system may be communicatively coupled via one or more communications buses.

The one or more processors may include one or more processing units (e.g., a central processing unit), cache, random access memory (RAM), read only memory (ROM), any other suitable components, or any combination thereof that may process information regarding the kiosk vending system. Memory may include any suitable volatile or non-volatile memory that may include, for example, random access memory (RAM), read only memory (ROM), flash memory, a hard disk, any other suitable memory, or any combination thereof. Information stored in memory may be accessible by processing equipment via communications bus. For example, computer readable program instructions (e.g., for implementing the techniques disclosed herein) stored in memory may be accessed and executed by processing equipment. In embodiments, memory includes a non-transitory computer readable medium for storing computer executable instructions that cause processing equipment (e.g., processing equipment of a suitable computing system), to carry out a method for controlling the kiosk vending systems and processes. For example, memory may include computer executable instructions for implementing any of the control techniques described herein.

In embodiments, communications interface includes a wired connection (e.g., using IEEE 802.3 Ethernet, or universal serial bus interface protocols), wireless coupling (e.g., using IEEE 802.11 "Wi-Fi," Bluetooth, or via cellular network), optical coupling, inductive coupling, any other suitable coupling, or any combination thereof, for communicating with one or more systems external to process control modules. For example, communications interface may include a USB port configured to accept a flash memory drive. In a further example, communications interface may include an Ethernet port configured to allow communication with one or more devices, networks, or both. In a further example, communications interface may include a transceiver configured to communicate using 4G or 5G standards over a cellular network.

In embodiments, the user interface includes a wired connection (e.g., using IEEE 802.3 Ethernet, or universal serial bus interface, tip-ring-seal RCA type connection), wireless coupling (e.g., using IEEE 802.11 "Wi-Fi," Infrared, Bluetooth, or via cellular network), optical coupling, inductive coupling, any other suitable coupling, or any combination thereof, for communicating with one or more of user interface devices. User interface devices may include a display, keyboard, mouse, audio device, any other suitable user interface devices, or any combination thereof. For example, a display may include a display screen such as, for example, a cathode ray tube screen, a liquid crystal display screen, a light emitting diode display screen, a plasma display screen, any other suitable display screen that may provide graphics, text, images or other visuals to a user, or any combination of screens thereof. Further, a display may include a touchscreen, which may provide tactile interaction with a user by, for example, offering one or more soft commands on a display screen. In a further example, user interface devices may include a keyboard such as a QWERTY keyboard, a numeric keypad, any other suitable collection of hard command buttons, or any combination thereof. In a further example, user interface devices may include a mouse or any other suitable pointing device that may control a cursor or icon on a graphical user interface displayed on a display screen. In a further example, user interface devices may include an audio device such as a microphone, a speaker, headphones, any other suitable device for providing and/or receiving audio signals, or any combination thereof. In embodiments, a user interface need not be included (e.g., control module need not receive user input nor provide output to a user).

In embodiments, a sensor interface may be used to supply power to various sensors, a signal conditioner, a signal pre-processor or any other suitable components, or any combination thereof. For example, a sensor interface may include one or more filters (e.g., analog and/or digital), an amplifier, a sampler, and an analog to digital converter for conditioning and pre-processing signals from sensors. In embodiments, the sensor interface communicates with sensor(s) via communicative coupling which may be a wired connection (e.g., using IEEE 802.3 Ethernet, or universal serial bus interface), wireless coupling (e.g., using IEEE 802.11 "Wi-Fi," or Bluetooth), optical coupling, inductive coupling, any other suitable coupling, or any combination thereof.

Sensors may include any suitable type of sensor, which may be configured to sense any suitable property or aspect of system components in a kiosk and processes, any other system, or any combination thereof. In embodiments, sensors include linear encoders, rotary encoders, or both, may be used by the control system to sense relative positions, speed, temperature, pressure, etc. In embodiments, sensors include various types of optical sensors including cameras configured to capture images (e.g., time-lapse imaging) of various aspects of the operation of the automated garment manufacturing systems and processes. In embodiments, temperature and pressure sensors include one or more temperature sensors such as, for example, a thermocouple, a thermistor, a resistance temperature detector (RTD), any other suitable sensor for detecting temperature, or any combination thereof. For example, sensors may include a thermocouple arranged to measure the temperature and/or viscosity of liquid adhesive to be applied to the webs.

Personalization Order

A control system may receive a personalization order from one or more of any of the user input devices noted above, including by not limited to, a user interface coupled to the housing of the kiosk, a smart device, and/or a remote computer. In some embodiments, the personalization order may be received at a user input device remote from the kiosk, and the personalization order may be sent to a portion of the control system without the kiosk. For example, a personalization order may be received at a remote POS system, and sent to a portion of the control system within the kiosk. In some embodiments, a remote user interface in response to user input may generate a physical or electronic receipt, for example a bar code or a QR code, corresponding to a personalization order, and the kiosk may include a user input for scanning the receipt in order to confirm the order, confirm payment for the order, and/or scan for verification prior to delivery of the personalized article.

The personalization order may include one or more of: the type of article(s), number of items, size(s), color(s), material(s), personalization type(s), personalization design(s), personalization location(s) and/or packaging(s). In embodiments, to order a personalized item, a user may be shown a GUI on a screen allowing the user to input criteria of the personalization order. For example, a user may input to the GUI: t-shirt, medium, white, 100% cotton, embroidery, yellow star shape design, center of shirt, boxed. In response to receiving the user input the control system would cause the conveying system and system components to perform the processes to complete the personalization order. In embodiments, the conveying system may retrieve the article of the personalization order from an automated storage and retrieval system (ASRS), which may be part of the personalization kiosk or part of another kiosk, and/or a user may physically transfer a selected article to a window of the kiosk to perform the personalization.

EXAMPLE EMBODIMENTS SHOWN IN THE FIGURES

Figure 1B:
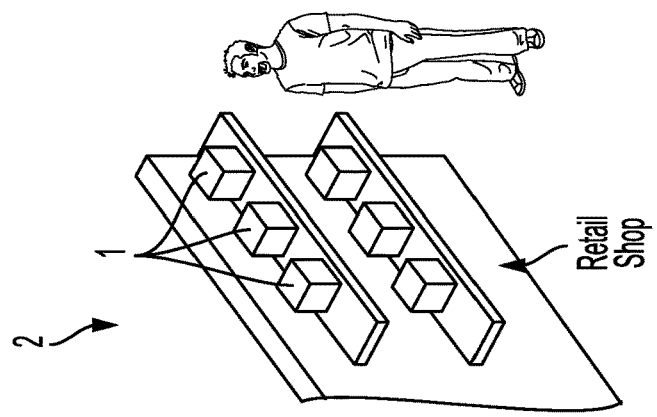
FIG. 1B shows a storage area of a retail store with an article to be used with a kiosk according to embodiments of the present technology.
Figure 1A:
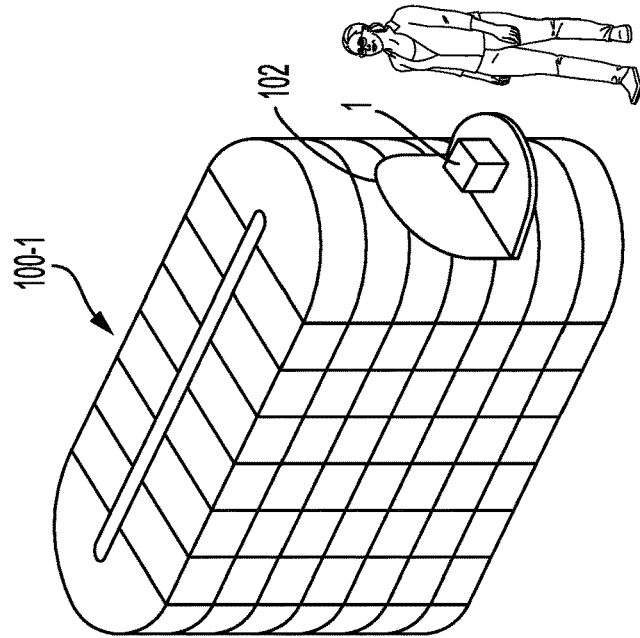
FIG. 1A shows a kiosk according to embodiments of the present technology.

FIGS. 1A-1C show embodiments of kiosks and retail store storage. For example, FIG. 1A shows a storage kiosk 100-1. The storage kiosk may comprise a window 102 into the housing. In response to receiving a personalization order, a control system may cause a conveying system to transfer an article 1 from within the storage kiosk 100-1 to the window for a user to receive. FIG. 1B shows a retail display and/or storage area 2 displaying and/or storing a plurality of articles which a user may select for personalization. FIG. 1C shows a personalization kiosk 100-2. The personalization kiosk 100-2 comprises a window 102. A user may place an article 1, for example from a storage kiosk 100-2 or a retail storage area 2, within the window 102 and a conveying system of the personalization kiosk 100-2 may transfer the article within the kiosk to be personalized according to the personalization order.

Figure 2:
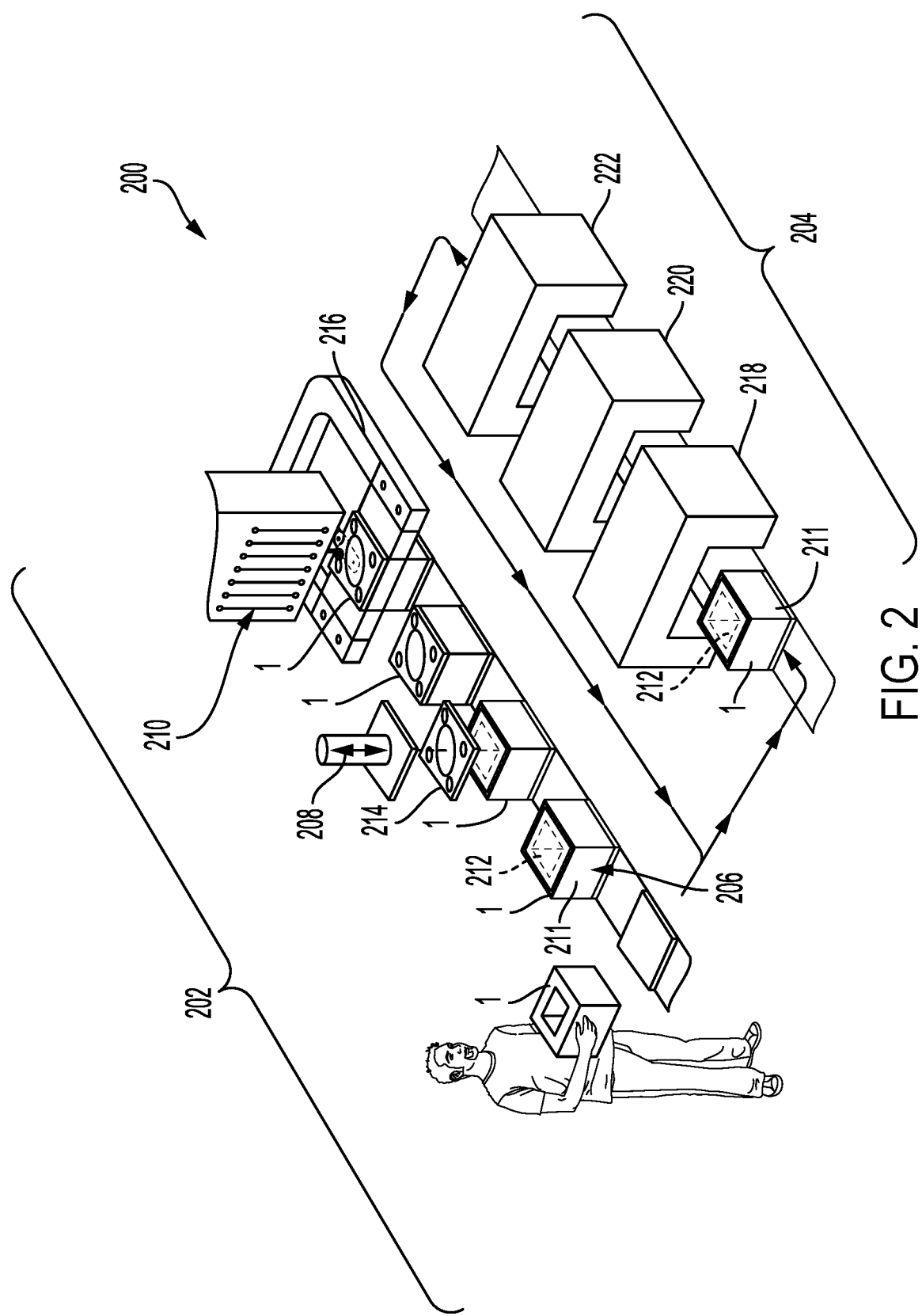
FIG. 2 shows internal system components of a kiosk according to embodiments of the present technology.

FIG. 2 shows an embodiment of system components 200, including a conveying system, within a personalization kiosk 100. As shown, the system components may include an embroidery system 202 and a DTG system 204. The control system may cause the conveying system 206 to transfer an article 1 through the embroidery system 202 and/or the DTG system 204 based on the personalization order. As shown, the conveying system 206 may include a conveyor belt to transfer and article 1 under one or more the system components.

In some embodiments, the article 1 may include any of the packaging shown in FIGS. 1A-14B and described in the disclosure of U.S. Application No. 63/111,591. For example, packaging may include one or more of an internal box portion, a top box portion, and a bottom box portion, the combination of which may be referred to as a retail box. In some embodiments, the article 1 received within the kiosk may include an item, e.g. a T-shirt, positioned around an internal box portion, or the article 1 received within the kiosk may include an item, e.g. a T-shirt, positioned around an internal box portion, positioned within a bottom box portion. An article in a configuration without the top box portion engaging with another box portion to clamp the item to be embroidered may be referred to as an article in an un-hooped configuration. An article in an un-hooped configuration may have a top hooping portion and/or a top box portion applied by a hooping system in order to hold the portion of the item to be embroidered taut within an embroidery window of the packaging. In some embodiments, the article 1 received within the kiosk may include an item, e.g. a T-shirt, positioned around an internal box portion, positioned within a bottom box portion, with a top box portion clamping the item to be embroidered within the packaging, and may be referred to as an article in a pre-hooped configuration. In some embodiments, the kiosk includes an inventory of retail boxes that package the articles in attractive presentation or packaging retail boxes, and that have a variety of pre-assembled hooping bottom plate, hooping pad and backing material, article ready for personalization, and hooping top plate, all pre-assembled and ready for the embroidery personalization operation. In embodiments including pre-assembled retail box combinations, each pre-assembled retail box combination may be appropriate for one or more types of personalization orders received by a customer.

As shown in FIG. 2, and noted above, an embroidery system 202 within a kiosk 100 may include a hooping system 208. In embodiments, for example as shown, an article 1 in an un-hooping configuration including an item to be embroidered and a portion of packaging may be received within a kiosk 100, for example by a user placing the article within the receiving window or the conveying system retrieving the article from a storage area of the kiosk, or another kiosk. As shown, the portion of packaging 211 may be an internal box portion and/or a bottom portion of a retail box containing the item 212 to be embroidered without a hoop lid 214, also referred to as a top box portion, hooping the item 212. Storing the article in an un-hooped configuration may be beneficial to the item as it avoids forming an unwanted hoop burn on the item to be embroidered. As shown in FIG. 2, the conveyor system 206 includes a conveyer belt which moves the un-hooped item to the hooping system 208 in order to be hooped. As shown, the hooping system 208 may hoop the item of the article 1 by pressing a hooping lid 214 into the portion of packaging 211 of the article so that the item 212 is taut in the embroidery window and ready for embroidery. In embodiments, the article may in the pre-hooped configuration and the conveying system may bypass the hooping system in response to the control system determining the article is pre-hooped, or the kiosk may be configured to only embroider pre-hooped items and not include a hooping system.

Further as shown in FIG. 2, the conveying system 206 may move the hooped article 1 under the embroidery machine 210. In embodiments, the control system actuates dynamic adaptors 216 grab the pre-hooped article 1 and secure it under the embroidery machine 210 and initiates embroidery operations. After the article 1 is embroidered, the control system may cause the conveyor system 206 to transfer the article 1 to another personalization system or to a window for pickup. Additionally, after the article 1 is embroidered, the control system may cause the conveyor system 206 to manipulate the article to be customer ready according to the personalization order, for example remove a hoop, place a lid on the packaging of the article, fold the article and/or wrap the article.

As shown in FIG. 2, and noted above, a DTG system 204 within a kiosk 100 may include a pretreatment system 218, a DTG printer 220, and a dryer 222. In embodiments, any of the DTG system components may include a dryer, for example the pretreatment system 218, and/or the control system may cause the conveying system to transfer an item to a drying system after any process step. In embodiments, for example as shown, an article 1 including an item to be personalized by DTG printing and a portion of packaging may be received within a kiosk 100, for example by a user placing the article within the receiving window or the conveying system retrieving the article from a storage area of the kiosk, or another kiosk. As shown, the portion of packaging 211 may be a bottom portion of a retail box containing the item 212 to be DTG personalized. The article 1 may be transferred by the conveying system 206 through each DTG system component.

Jig Embodiment

In embodiments, the conveying system may include a jig for receiving an article to be personalized. The jig may define a body over which an article is placed, for example by a user or by a robotic arm. The article may be transferred between windows and system components while positioned over the jig. In some embodiments, the jig comprises components for hooping an item to be personalized. In some embodiment, the jig may comprise a body on or over which an article is placed.

In some embodiments, the jig may comprise a hollow body, which may be a wire frame body. The hollow cavity of the jig may be used for receiving a portion of a system component, for example a part of the hooping system or embroidery machine. The jig may further define receiving openings for receiving hooping plates used for retaining a hooped portions of an article to the jig.

Personalization systems may include structures and configurations for personalizing an article positioned on a jig. For example, as will be discussed in greater detail below, an embroidering system may include a hooping system for hooping an article on a jig, and an embroidering machine may include heads to be received within the jig.

FIGS. 3A-3D show an embroidery system including a jig 302. In embodiments, the jig 302 may also be used with other personalization systems, for example DTG systems. As shown the system includes a pivotable jig 302 on a track 304. The track 304 may be part of a conveying system 206. The jig system includes electromagnetic or active actuators 306, and/or passive components such as constant force springs or hydraulic springs, as shown in FIGS. 4A-4C for pivoting the jig 302 between a horizontal or near horizontal position, and a vertical or near vertical position, and any position in between. The jig system further includes actuators for translating the jig along the tracks, for example with cog wheels 308.

Figure 3B:
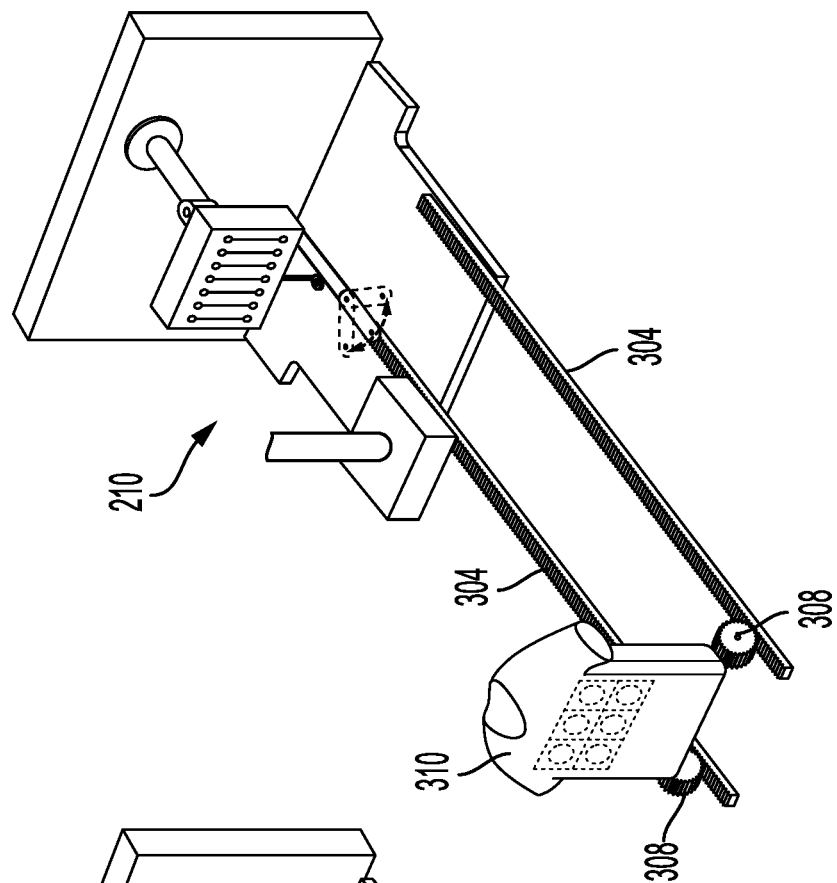
FIGS. 3A-3D show the internal system components of a kiosk and a corresponding process step of the system components according to embodiments of the present technology.
Figure 3A:
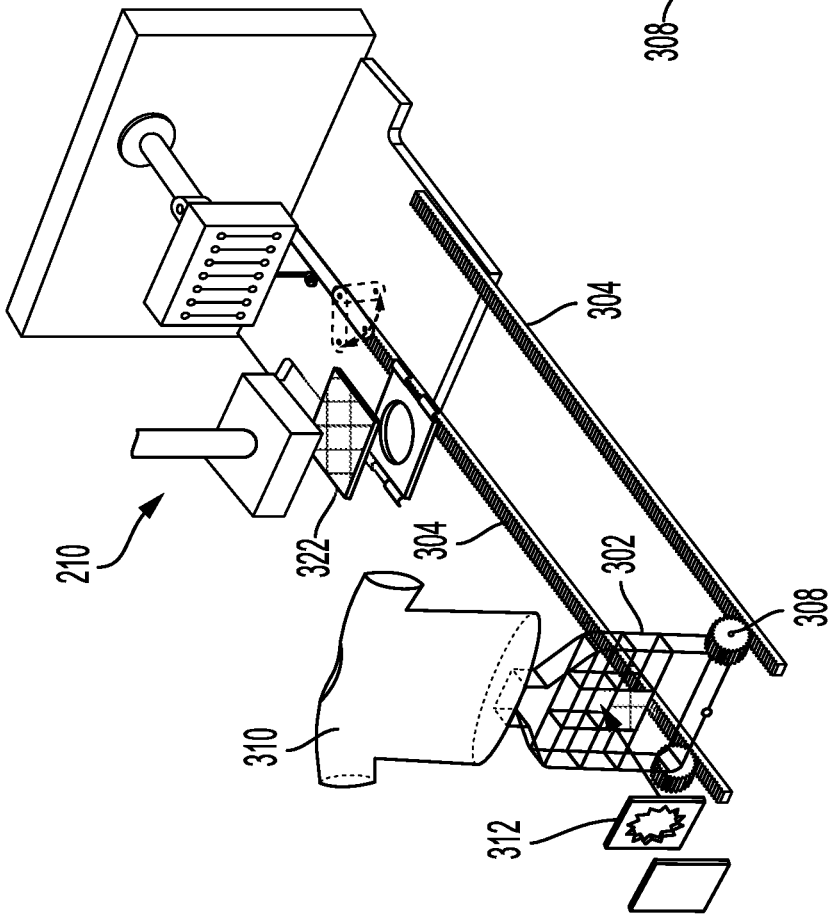
Figure 4C:
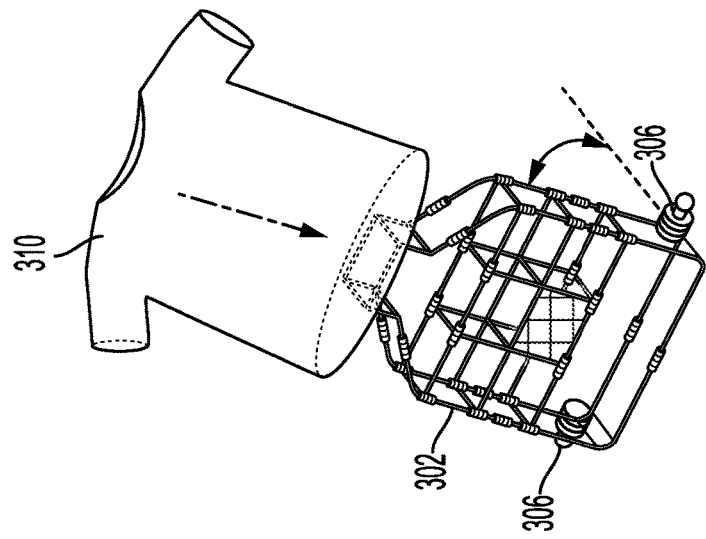
FIGS. 4A-4D show a jig of a kiosk according to embodiments of the present technology.
Figure 4B:
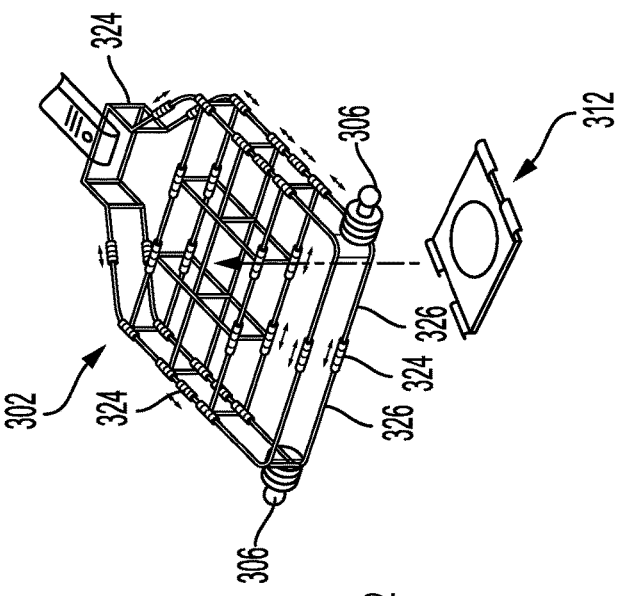

In embodiments, the control system may cause a jig 302 to be positioned in a loading configuration, for example as shown in FIG. 3A. In the loading configuration, the jig 302 may be vertical, or near vertical (i.e. within 15 degrees of vertical). In the loading configuration the jig 302 may be positioned near or outside of a window of the kiosk 100 so that a user can position an item, for example a t-shirt 310, over the jig 302, as shown in the transition between FIGS. 3A and 3B. In embodiments, the jig 302 may be shaped to receive various types of items, for example dresses, skirts, pants, shorts, gloves, mittens, etc.

With an article, in this example the T-shirt 310, positioned over the jig 302, the jig 302 may be transitioned to a hooping configuration. In the hooping configuration, the jig 302 may be pivoted to be horizontal or near horizontal (e.g within 15 degrees of horizontal), for example as shown in FIG. 3C. In the hooping configuration a hooping system 208 may hoop an article, in this example a T-shirt 310, to the jig 302, as shown in FIG. 3C.

Figure 4D:
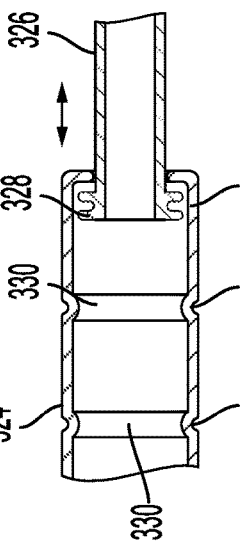
Figure 4A:
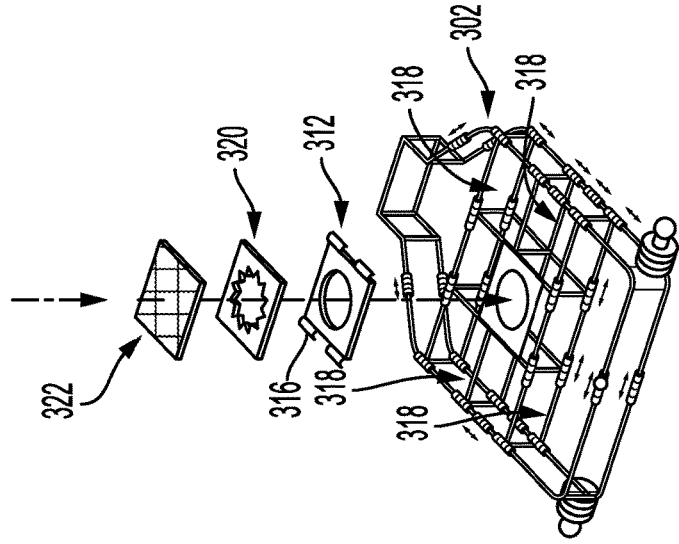
Figure 5C:
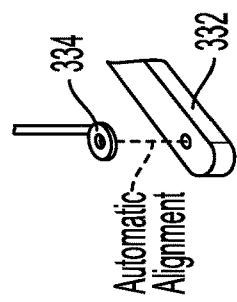
FIGS. 5A-5C show the use of a jig of a kiosk for embroidery according to embodiments of the present technology.
Figure 5B:
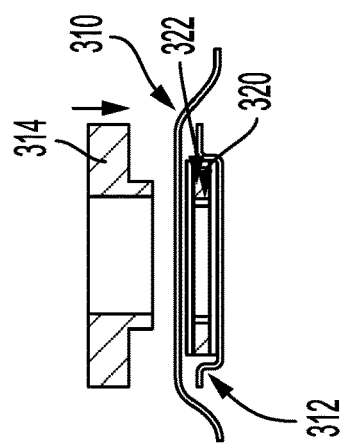

In embodiments, jigs 302 may include hooping bottom plates 312 coupled to the jig 302. The bottom hooping plate 312 may be coupled to a top hooping plate 314 with the item, in this example the T-shirt 310, clamped between. FIG. 4A shows an example of a jig 302 including a bottom hooping plate 312. In embodiments, the bottom hooping plate 312 is coupled with clips 316 to a wire frame of the jig 302. In some embodiments, clips 316 of the bottom hooping plate 312 may provide a degree of flexibility and snap into and out of place by the application of some force. In embodiments, for example as shown in FIG. 4A, the wire frame may define a plurality of positions 318 which a bottom hooping plate 312 may be coupled. The control system may cause the conveyor system to couple a bottom hooping plate 312 to the jig 302 according to the personalization order designated personalization location prior to positioning the jig 302 in the loading configuration. As shown in FIG. 4A, a hooping pad 320 and embroidery backing 322 may be coupled to the hooping bottom plate 312 prior to placing the jig 302 in the loading configuration. The control system may cause the conveying system to couple one of a plurality of types of backing 322 to the hooping bottom plate 312 based on the personalization order. FIG. 5B shows the arrangement of the bottom hooping plate 312, hooping pad 320, backing 322, T-shirt 310, and hooping top place 314.

In embodiments, the wire frame of the jig 302 may be adjustable in size in order for the same jig to accommodate multiple different sizes of items, for example small (s), medium (m), and large (l) large t-shirts. Joints 324 between wire elements 326 of the wire body of the jig 302 may include expanding joints allowing the wire elements 326 to telescope to various positions within the joints. As shown in FIG. 4D, the ends 328 of each wire element 326 within an expandable joint 324 may include an enlarged end for engaging with ridges 330 in the joint 324 so that the joint will allow multiple different positions of the wire elements to be set. In embodiments, the control system may cause the conveying system to manipulate the wire frame, for example with robotic arms in combination with cameras and/or position sensors, to adjust the size of the jig 302 prior to presenting it to a user in the loading configuration based on the size of the article indicated in the personalization order. In embodiments, a user may be instructed by the user interface to adjust the size of the jig in the loading position prior to placing the article, in this example a T-shirt 310, over the jig 302.

Figure 3D:
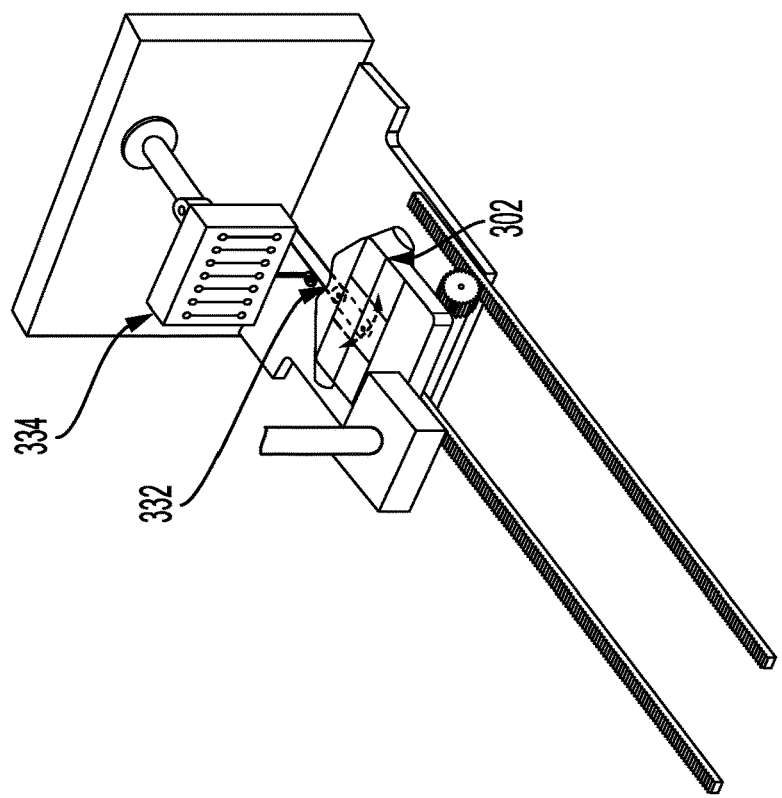
Figure 3C:
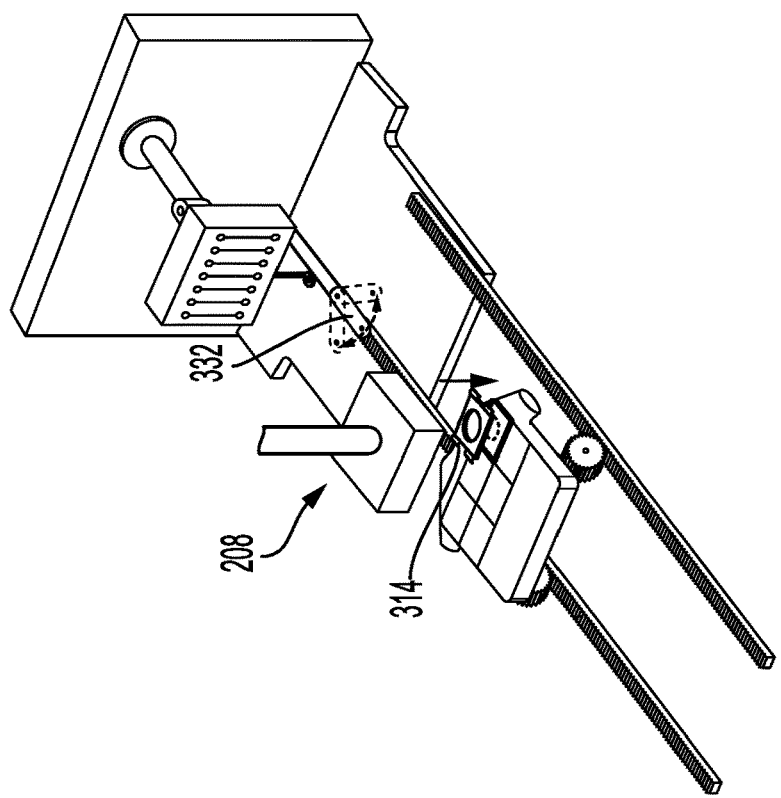
Figure 5A:
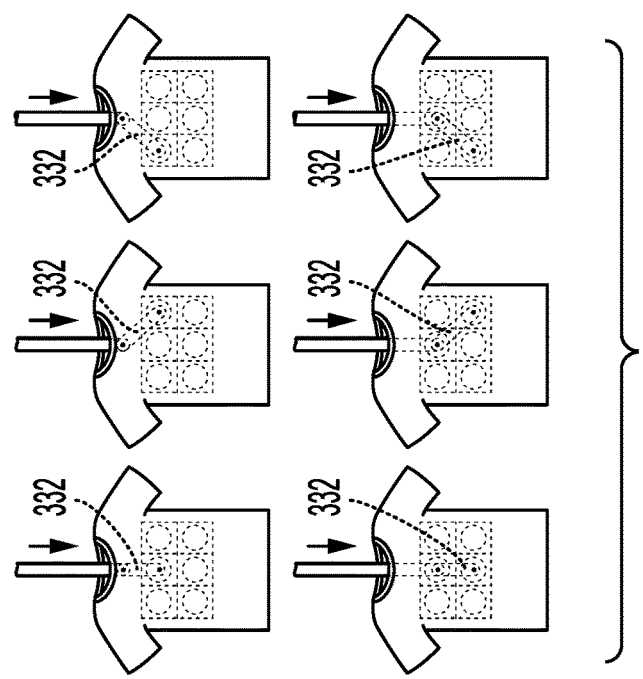

With an item hooped on the jig 302, the control system may cause the item on the jig to be transferred to an embroidery machine 210, as shown in FIG. 3D. The embroidery machine may include a lower cylinder head 332 and an upper head 334. The lower cylinder head 332 may dispense lower thread for the embroidery and the upper head 334 may dispense upper thread as shown in FIG. 5C. The lower cylinder head 332 may be pivotable relative to the jig 302, for example as shown in FIG. 5A. Pivoting the lower cylinder head 332 allows various portions of the article, in this example T-shirt 310, to be embroidered. For example, as shown, the pivotable lower cylinder head 332 allows six distinct embroidery windows of the T-shirt 310 to be embroidered. In embodiments, a jig 302 may have any number of embroidery windows, and corresponding bottom hooping plates 312 coupled to the jig 302 at the embroidery windows. In some embodiments, the lower cylinder head 332 and the upper head 334 may be aligned using a camera and using artificial vision software or position sensors to align the lower cylinder head 332 and upper head 334. In some embodiments, the embroidery system may use one or a select number of embroidery threads with a given thickness. In some embodiments, the embroidery thread is in one color (e.g., white) and the thread is colored in-situ prior to the embroidery application per the requirements of the personalization art design. In some embodiments, the selections of article fabric weights and thicknesses, art designs, backing material types and thicknesses, the thread types and thicknesses, and the embroidery needle types and thicknesses are pre-matched and limit the number of possible user choices, in order to allow for a compact and efficient kiosk design, simplified operation, and the total or partial elimination of manual and/or skilled labor. In some embodiments, a correspondence table includes all the possible combinations of embroidery parameters that determine the choices of personalization embroidery available by the kiosk.

Figure 7:
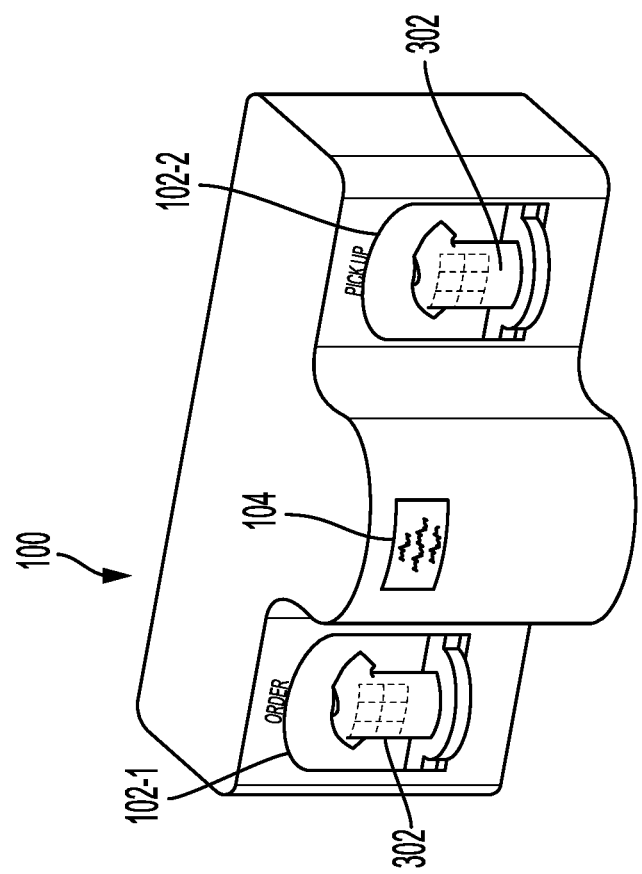
FIG. 7 shows a kiosk according to embodiments of the present technology.
Figure 6:
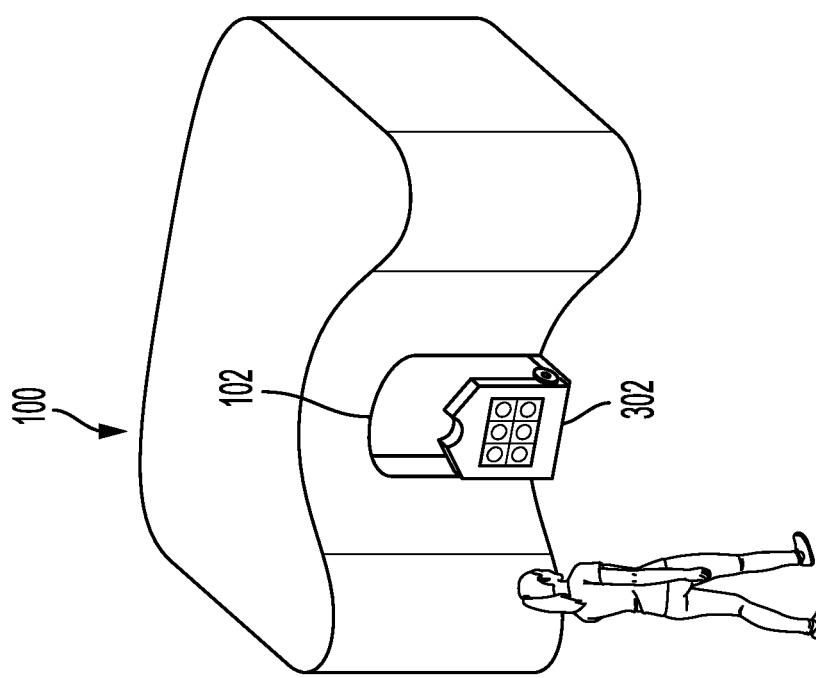
FIG. 6 shows a kiosk according to embodiments of the present technology.
Figure 8:
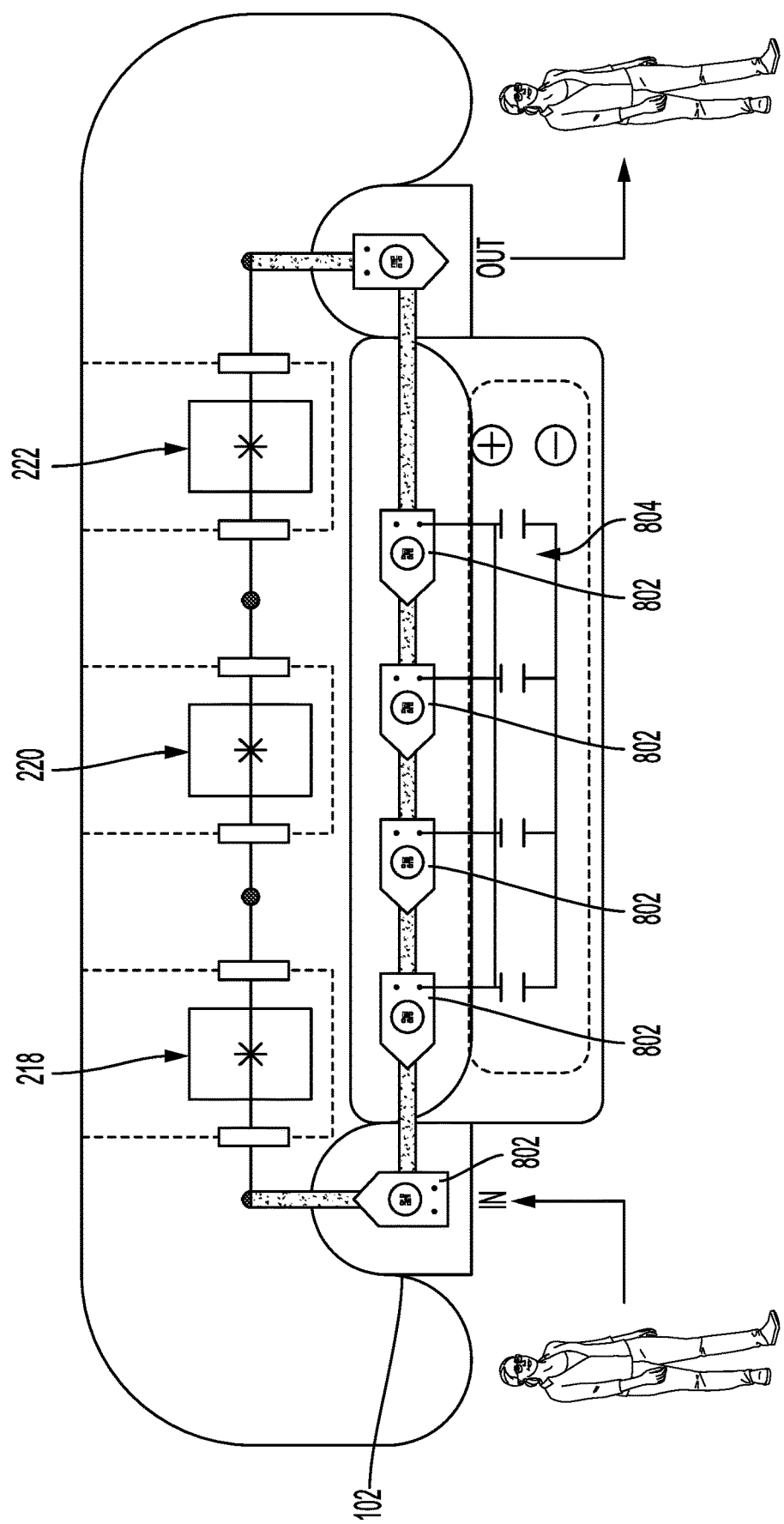
FIG. 8 shows internal system components of a kiosk according to embodiments of the present technology.

In embodiments, a kiosk 100 may include a single window 102, for example as shown in FIG. 6. As shown in FIG. 6, in embodiments a jig 302 may be moved within the window 102 in the loading configuration so that a user can load an un-personalized article, and unload a personalized article at the same window. In embodiments, a kiosk 100 may have two windows 102, as shown in FIG. 7. As shown, in embodiments, a jig 302 may be moved within a receiving window 102-1 in the loading configuration so that a user can load an un-personalized article, the article may then be personalized within the kiosk, and the jig 302 may be transferred to a delivery window 102-2 so that the user can unload a personalized article at a different window. Multiple windows may provide the advantage of multiple personalizations being performed simultaneously. As noted above, a conveying system may include vehicles, for example trackless vehicles. In some embodiments, a conveying system may include vertical elevators for transferring vehicles between different levels of vertically stacked system components. The trackless vehicles may be self-powered, controlled wirelessly by the control system, and/or self-controlled with no input from the control system. FIG. 8 shows an embodiment of a personalization kiosk including self-powered vehicles 802. The self-powered vehicles may be line following vehicles, or may have other sensors used for navigation and position detection. The self-powered vehicles may include scanning capability to read bar code or quick response (QR) code that provides at least part of the instructions directing the self-powered vehicle's operations. The self-powered vehicles may include a jig or platen for receiving an article to be personalized. In embodiments, the vehicles transfer articles to system components of personalization systems, for example embroidery systems or DTG systems, as discussed above.

A shown in FIG. 8, the vehicles 802 may charge in a charging area 804. In response to receiving a personalization order, the control system may instruct a vehicle 802 to move to a window 102 of a kiosk 100. At the window 102, a user may place an item, for example a T-shirt, onto a platen or jig coupled to the vehicle 802. Alternatively, in embodiments, the conveying system may, for example a robotic arm, may load the platen or jig. In embodiments, a T-shirt may be placed onto the platen using a moving roller that unrolls the T-shirt onto the DTG platen. In embodiments, the T-shirt is dressed over the platen and the platen may be equipped with tubes or channels that direct forced air to the T-shirt hem or neckline to open the T-shirt and help in sliding the T-shirt onto the platen. In embodiments, the use of the directed air tubes and channels allow for the article to be embellished to slip onto the platen under the force of gravity and without requiring substantial additional forces. In embodiments, the air tubes and channels open up the T-shirt and create an air cushion that provides a fluid bearing between the T-shirt layer and the platen, providing for an easier dressing of the platen with the T-shirt.

After loading, the control system may then instruct the vehicle, or a plurality of vehicles, to transfer the T-shirt to a sequence of system components for personalization. For example as shown, the vehicle 802 may transfer the T-shirt to a pretreatment system 218, a DTG printer 220, and a dryer 222. In embodiments, the vehicles 802 may leave an article within a system component during processing and return after the processing is complete. For example, the platen carrying the T-shirt may be moved to the pretreatment system by the vehicle. In embodiments, each DTG processing stage is enclosed in a chamber that is sealed prior to the DTG processing commencement. In embodiments, one or more DTG processing chamber may be operable to be fully sealed and any chemicals, vapors, odors or fumes may be extracted through filters and/or vents, from the chamber, during or at the end of each process, but in all cases prior to unsealing the chamber to allow for the insertion or retrieval of the article carrying platen. The vehicle parking the platen in place and moving out of the processing chamber prior to the commencement of the DTG processing step may be beneficial to protect the vehicle from being exposed to problematic chemicals.

In embodiments, the vehicle may also be used with embroidery systems. After a personalization is complete, the control system may cause the vehicle 802 carrying the personalized article to a window 102 for a user to remove from the vehicle 802. In embodiments, after personalization and prior to customer pickup, the conveying system may further process the article. For example, the conveying system may remove the T-shirt from the jig or platen and fold and/or package the T-shirt.

FIGS. 9A-9D shows a robotic arm 902 that a control system may actuate in order to load a vehicle 802 with an article, for example a T-shirt. As shown in FIG. 9A, a T-shirt 904 corresponding to the personalization order may be retrieved from an inventory of different T-shirts of different sizes and/or styles/colors. The robotic arm 902 includes joints 906 allow a plurality of degrees of freedom, and soft grippers 908 for grasping articles.

As shown in FIG. 9C, in embodiments, the robotic arm may 902 be used to grab the T-shirt 904 and either place it on the platen 910, or pull it onto a platen 910. In embodiments, the robotic arm 902 is equipped with grippers 908 that are operational to grab each T-shirt 904 individually and place the T-shirt on the platen. In embodiments, the robotic arm grippers may be soft grippers that may include an outer skin made of rubber or similar material. In some embodiments, the grippers fingers or claws may open and close via electromechanical motors, or pneumatic motors. In embodiments, the gripper fingers may include surface features that enhance the ability for the grippers to grab the T-shirt.

In embodiments, the robotic arm 902 may include a hoop frame gripper 912 operable to grab an upper hooping plate 914 and place the hooping frame on a lower hoop plate 916 for embroidery operations or a platen for DTG printing operations, as shown in FIG. 9C. In embodiments, the hoop frame gripper may be operable to use magnetic force to grab onto or release the hoop upper plate.

As shown in FIG. 9D, in embodiments, the robotic arm may rotate 180 degrees or 360 degrees about its axis. In embodiments, one end of a two ended robotic arm may include soft grippers operable to grab T-shirts and the other end of the robotic arm may include a gripper operable to grab and place a top hooping plate onto a bottom hooping plate for embroidery processing or directly onto a platen for DTG printing. In some embodiments, the top hopping plate gripper is an electromagnetic gripper.

Pretreatment

In embodiments, the pretreatment system of a DTG system may apply pretreatment solution to an entire side of an article to be DTG printed on or may only apply pretreatment solution to a portion to be printed on according to the personalization order. For example, if a personalization order indicated the printing area to be a 4"×4" area on the left front breast of a T-shirt, the pretreatment solution is only applied to that area, instead of a larger portion of the shirt, for example the entire front portion, or an area spanning the entire width of the shirt.

Figure 10B:
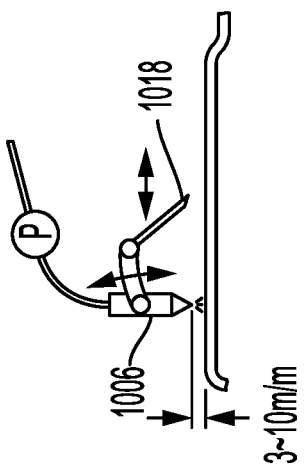
FIGS. 10A-10D show internal system components of a kiosk including a pretreatment machine according to embodiments of the present technology.
Figure 10C:
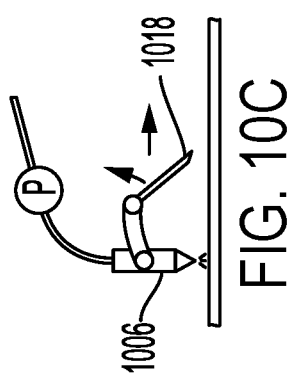
Figure 10D:
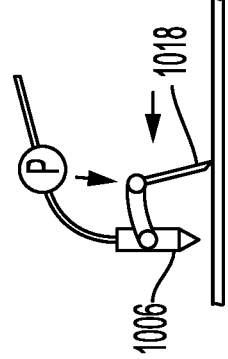
Figure 10A:
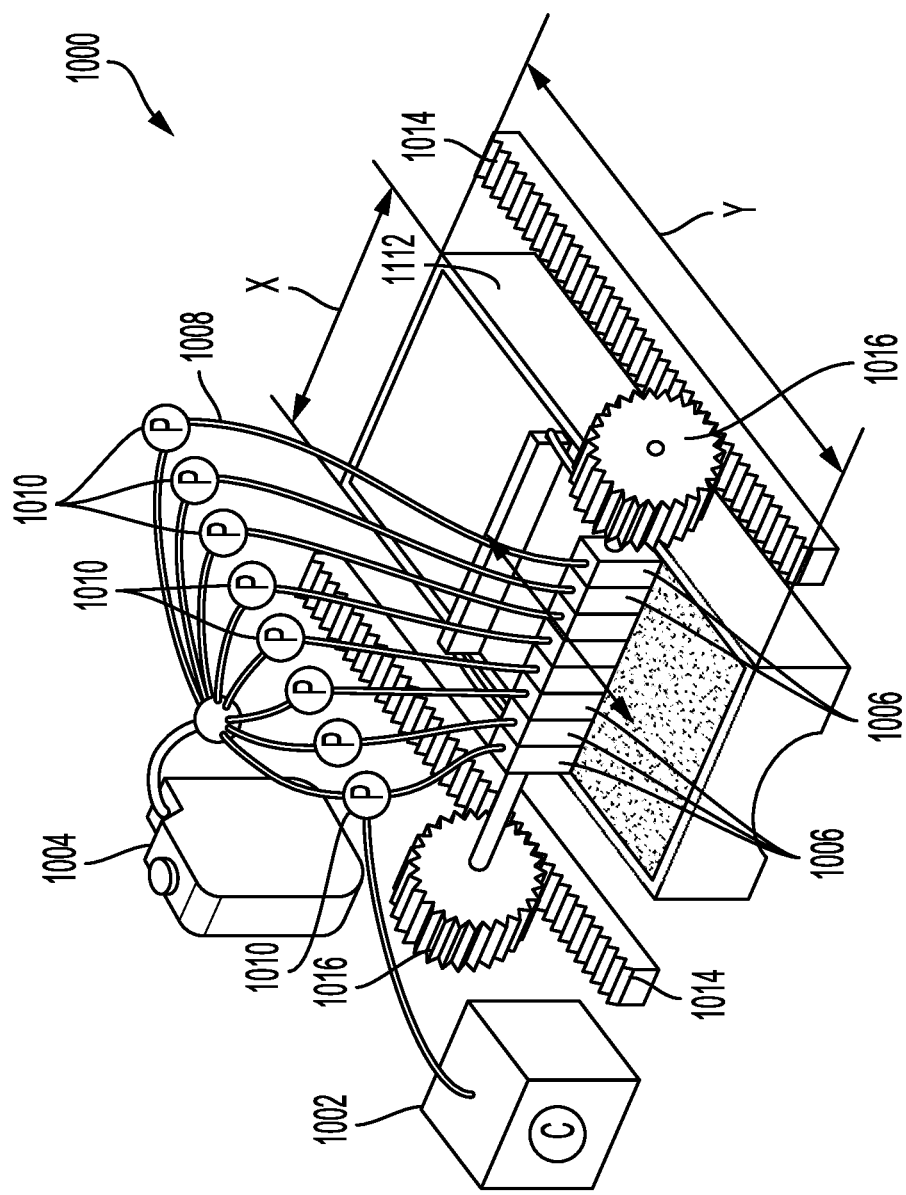

FIGS. 10A-10B show an embodiment of a pretreatment system 1000. As shown, the pretreatment system 1000 includes a controller 1002 (which may be part of the control system of the kiosk), a pretreatment solution reservoir 1004, and a plurality of dispensing heads 1006. The dispensing heads 1006 are connected to the pretreatment solution reservoir 1004 with lines 1008. The pretreatment system 1000 further includes a plurality of actuators 1010 connected to each line. The actuators 1010 may be pumps and/or valves connected to the controller 1002. The controller 1002 may selectively actuate the actuators 1010 in order to dispense pretreatment solution from any combination of one or more dispensing heads 1006.

As shown, the dispensing heads 1006 may be arranged in a line, which may be considered the X-direction. In embodiments, the pretreatment system 1000 may include any number of dispensing heads 1006 and corresponding actuators 1010.

Figure 11:
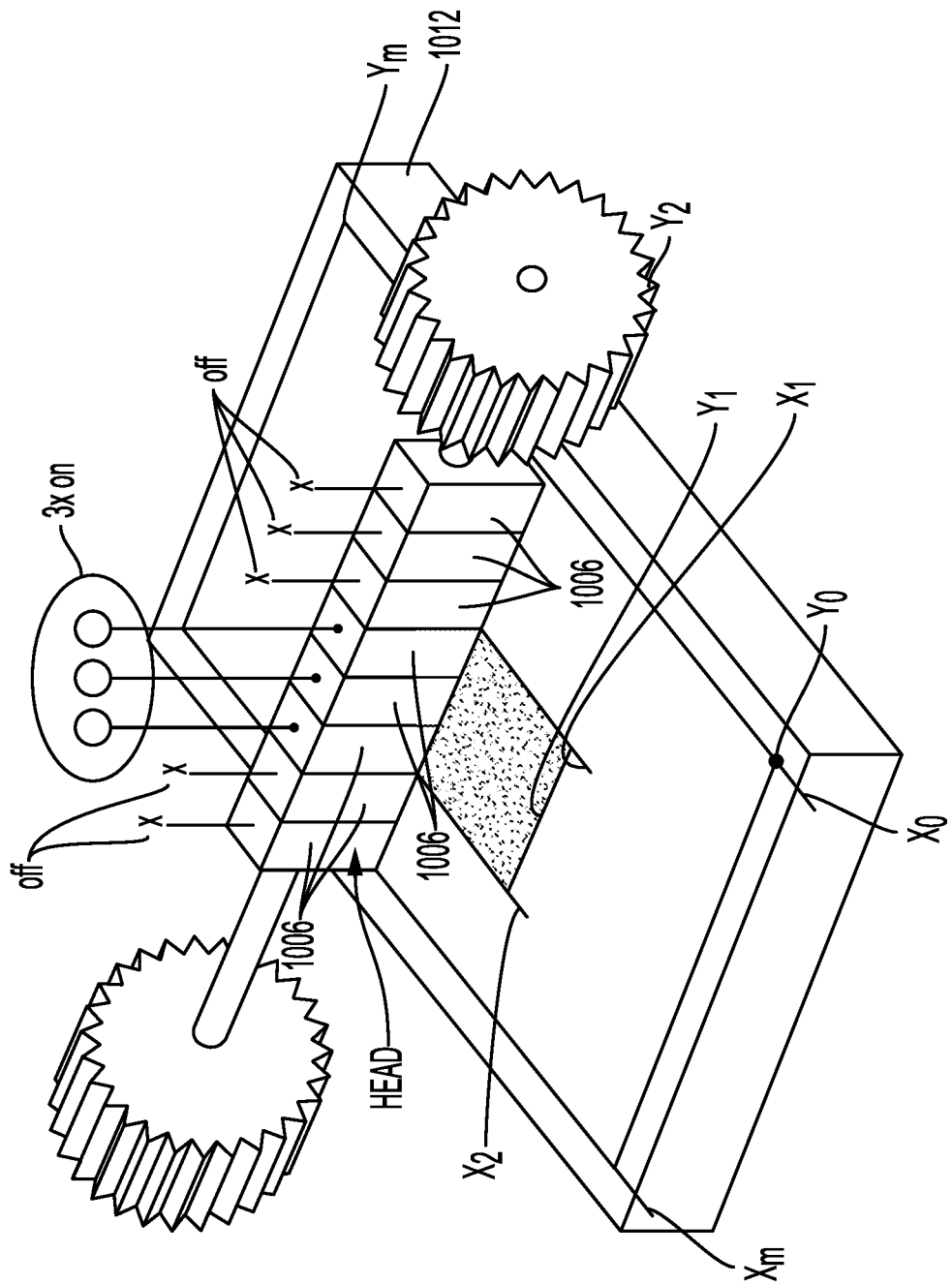
FIG. 11 shows internal system components of a kiosk including a pretreatment machine according to embodiments of the present technology.

The pretreatment system 1000 may further comprise a platen 1012, which may also be part of a conveying system as discussed above. The platen 1012 may be movable relative to the dispensing heads 1006 in a Y-direction, perpendicular to the X-direction, for example with a track 1014 and cog wheels 1016. With the selective dispensing in the X-direction and relative movement in the Y-direction, the control system may cause pretreatment solution to be selectively applied to any portion of an article on the platen 1012, while leaving any portion of the article untreated. For example, as shown in FIG. 11, in an assembly of eight dispensing heads 1006, the first two may be turned off by the control system, the next three turned on, and the next two turned off. The controller may cause dispensing as the platen is moved in the Y-direction resulting in a rectangular subportion of the article being pretreated. In embodiments, any pattern and shape of one or more pretreatment areas may be applied to an article. This is beneficial in reducing the amount of pretreatment solution used, the amount of time pretreating an article, and the amount of time drying the article before and/or after DTG printing.

In embodiments, the dispensing heads may be located less than 20 mm from the article surface, and may be between 3 mm and 10 mm, as shown in FIGS. 10B-10C in order to precisely control the area in both the X and Y directions that are pretreated. In embodiments, each dispensing head may include one or more slots for dispensing the PT solution in a uniform and consistent manner. In embodiments, the PT solution dispensing heads may comprise multiple fine holes to spray the PT solution in a uniform and consistent way over the desired area. In embodiments, each PT solution dispensing head may be fed by one or more tubes or hoses that carry the PT solution to the PT solution dispensing head. In embodiments, the flow in each feeding tube or hose may be controlled independently through a solenoid valve, pneumatic valve, or other means. In embodiments, all PT solution dispensing heads are controlled through a single manifold that controls the flow of PT solution.

In embodiments, after the PT solution is dispensed, a PT solution spreader, scraper or roller 1018 may be lowered onto or near the T-shirt fabric to spread the PT solution and allow for absorption of the PT solution into the fabric. In embodiments, the PT solution spreader 1018 may be actuated by the control system to be lowered near the fabric only at certain point in the operation of the PT solution dispensing head, as shown in FIGS. 10B-10D.

Figure 13:
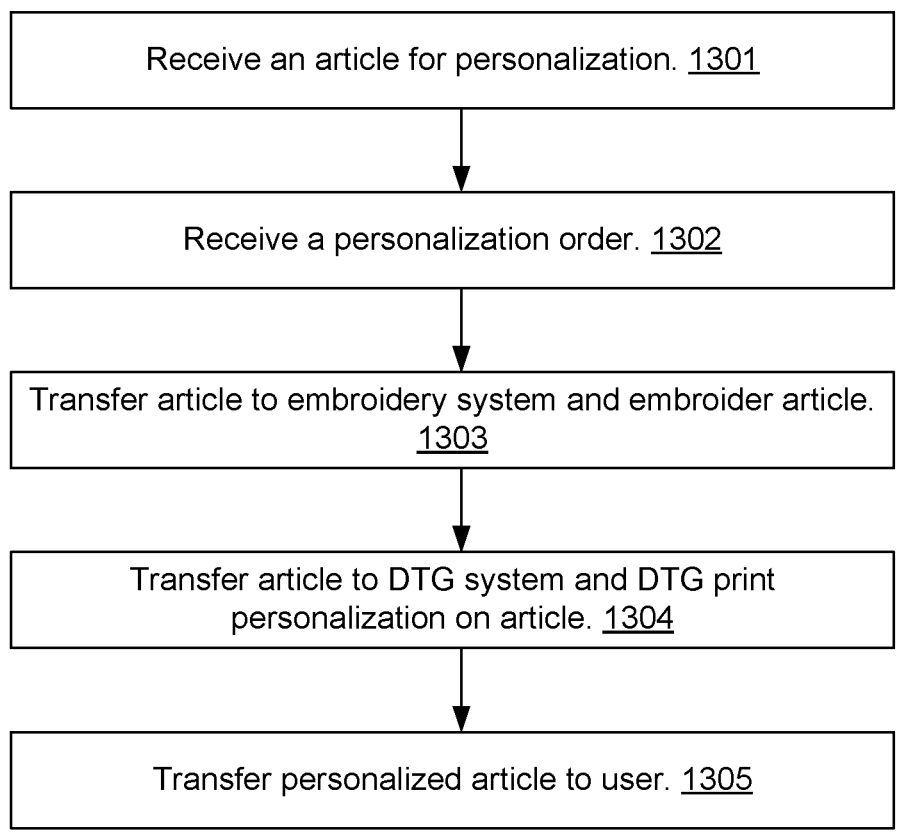
FIG. 13 shows a flowchart of process steps of a kiosk according to embodiments of the present technology.

FIG. 13 shows a flow chart 1300 of a personalization process according embodiments of the disclosed technology. In embodiments, a kiosk system may receive an article for personalization, as shown in step 1301. The article may include an item to be personalized assembled with components of packaging in a pre-hooped configuration. The control system of a kiosk system may receive a personalization order, as shown in step 1302. Steps 1301 and 1302 may be performed in any order relative to each other including simultaneously. In response to receiving the article and the personalization order, the control system may control the system components of the personalization systems and the conveying system so that the article is personalized without human intervention once within the housing. For example as shown in step 1303, the conveying system may transfer the article to an embroidery system and the article may be embroidered according to the personalization order. Further, as shown in step 1304, the conveying system may transfer the article to a DTG system and the article may receive DTG printing according to the personalization order. Steps 1303 and 1304 may be performed in either order relative to each other, or may be omitted based on the personalization order. Once an article is personalized according to the personalization order, the article may be transferred to a user, as shown in step 1305, and discussed above.

While the above examples pertained to kiosk for personalization of an article including embroidering and DTG, the same systems and methods may be used to personalize an article with other techniques, such as, but not limited to a combination of one or more of dye sublimation, heat transfer printing processes, acid washing, and laser etching.

The technology has now been described in detail for the purposes of clarity and understanding. However, those skilled in the art will appreciate that certain changes and modifications may be practiced within the scope of the appended claims.

What is claimed is:

1. A system for personalizing an article, the system comprising:
    a housing;
    a personalization system within the housing comprising a plurality of system components configured for personalizing the article, wherein the personalization system includes:
        an embroidery system, and
        a hooping system;
    a conveying system within the housing and configured to transfer the article between the system components; and
    a control system configured to control components of the system to:
        receive a personalization order,
        position the article on the hooping system,
        transfer the article on the hooping system to the embroidery system,
        generate a personalized article by applying an embroidery on the article using the embroidery system based on the personalization order without human intervention once the article is within the housing, and
        transfer the personalized article to an output window of the system.

2. The system of claim 1, wherein the embroidery system comprises:
    an upper head; and
    a lower cylinder head configured to dispense a lower thread for the embroidery, wherein the upper head is configured to dispense an upper thread, wherein the lower cylinder head is pivotable relative to the hooping system to allow a plurality of distinct embroidery windows of the article to be embroidered.

3. The system of claim 2, wherein the lower cylinder head and the upper head are aligned using one or more of a camera, an artificial vision software, or a position sensor.

4. The system of claim 1, wherein the embroidery system comprises one or more embroidery threads, wherein at least two embroidery threads have different thickness, wherein the one or more embroidery threads are in one color, and wherein at least one embroidery thread among the one or more embroidery threads is colored in-situ prior to the embroidery system applying the embroidery on the article based on the personalization order.

5. The system of claim 1, wherein the control system is further configured to:
    select, among a plurality of embroidery backings, an embroidery backing based on one or more of a material weight of the article, a fabric of the article, a personalization art design associated with the personalization order, or a number of stitches per inch required for the personalization art design; and
    control the conveying system to transfer the embroidery backing from a storage area to a location near the hooping system where the embroidery backing is coupled to the hooping system.

6. The system of claim 1, wherein the personalization system further comprises a direct to garment printing system (DTG system).

7. The system of claim 1, wherein the conveying system comprises a plurality of trackless vehicles that are self-powered, wherein the control system is configured to wirelessly instruct the trackless vehicles to transfer the article between the plurality of system components.

8. The system of claim 1, wherein the hooping system includes a jig defining a body on the article is placed, wherein the jig is shaped according to the article.

9. The system of claim 1, wherein the housing comprises an input window for receiving the article prior to personalization.

10. The system of claim 9, wherein the input window is the same as the output window.

11. The system of claim 1, wherein the control system is further configured to control the conveying system to remove the personalized article from the hooping system, and place the personalized article in a packaging prior to transferring the personalized article to the output window of the system.

12. The system of claim 1, further comprising:
a robotic arm, wherein the control system is further configured to control the robotic arm to place the article on the hooping system.

13. The system of claim 12, wherein the control system is further configured to control the robotic arm to retrieve the article from an inventory of articles based on the personalization order.

14. The system of claim 13, wherein the robotic arm is configured to select the article among the inventory of articles based on one or more of an article fabric weight, an article fabric thickness, an art design of the personalization order, a backing material type, a backing material thickness, a thread type, a thread thickness, an embroidery needle type, or an embroidery needle thickness based on the personalization order.

15. The system of claim 13, wherein the robotic arm includes a first end having one or more soft grippers operable to grab the article and a second end having an electromagnetic gripper operable to grab and place a top hooping plate onto a bottom hooping plate for embroidery processing.

16. The system of claim 1, wherein the hooping system includes a wire frame body that is adjustable to accommodate one or more different sizes of the article,
wherein the system includes a robotic arm, and
wherein the control system is further configured to control the robotic arm to adjust the wire frame body based on a size of the article.

17. The system of claim 1, wherein the conveying system comprises a plurality of trackless vehicles that are self-powered, wherein the control system is configured to wirelessly instruct the trackless vehicles to transfer the article between the plurality of system components.

18. The system of claim 1, wherein the system is configured to perform personalizations on multiple articles simultaneously.

19. The system of claim 1, wherein the control system receives the personalization order from one or more of a user interface coupled to the system, a smart device, or a remote computer.

20. The system of claim 1, wherein the conveying system is configured to unpack the article from a box, or package the personalized article into a same or different box.

* * * * *